United States Patent
Bhattacherjee et al.

(10) Patent No.: US 10,885,567 B2
(45) Date of Patent: Jan. 5, 2021

(54) METHOD, COMPUTER-BASED SYSTEM, AND NON-TRANSITORY COMPUTER READABLE STORAGE MEDIUM UTILIZING MACHINE LEARNING TO PREVENT FRAUD WITH A DIGITAL WALLET

(71) Applicant: AMERICAN EXPRESS TRAVEL RELATED SERVICES COMPANY, INC., New York, NY (US)

(72) Inventors: Subhajit Bhattacherjee, Anthem, AZ (US); Asish Soudhamma, Peoria, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 198 days.

(21) Appl. No.: 15/863,298

(22) Filed: Jan. 5, 2018

(65) Prior Publication Data
US 2019/0213658 A1    Jul. 11, 2019

(51) Int. Cl.
G06Q 30/00 (2012.01)
G06Q 30/06 (2012.01)
G06Q 20/40 (2012.01)
G06Q 30/02 (2012.01)

(52) U.S. Cl.
CPC ..... *G06Q 30/0629* (2013.01); *G06Q 20/4016* (2013.01); *G06Q 30/00* (2013.01); *G06Q 30/0206* (2013.01); *G06Q 30/0207* (2013.01); *G06Q 30/0261* (2013.01); *G06Q 30/0283* (2013.01); *G06Q 30/06* (2013.01)

(58) Field of Classification Search
CPC ............. G06Q 30/0629; G06Q 30/0601–0645
USPC ................................................. 705/26.1–27.2
See application file for complete search history.

(56) References Cited

U.S. PATENT DOCUMENTS

| 9,727,867 | B2 | 8/2017 | Hefetz et al. |
| 2006/0242192 | A1 | 10/2006 | Musgrove et al. |
| 2013/0054336 | A1* | 2/2013 | Graylin .................. G06Q 40/02 705/14.26 |
| 2013/0191213 | A1* | 7/2013 | Beck .................. G06Q 30/0267 705/14.53 |
| 2017/0193542 | A1* | 7/2017 | Rapaka ............. G06F 16/24578 |
| 2017/0201521 | A1 | 7/2017 | Bruno et al. |

OTHER PUBLICATIONS

European Union Agency for Network and Information Security, "Security of Mobile Payments and Digital Wallets", Dec. 2016, Enisa, pp. 19-46 (Year: 2016).*
International Search Report and Written Opinion for PCT Patent Application PCT/US18/66735 dated Apr. 15, 2019.

* cited by examiner

*Primary Examiner* — Jeffrey A. Smith
*Assistant Examiner* — Jason B Warren
(74) *Attorney, Agent, or Firm* — Thomas Horstemeyer, LLP

(57) ABSTRACT

A consumer may enter a physical merchant location. A reverse bidding system determines a confidence score that the consumer will make a non-fraudulent purchase of a product. The reverse bidding system performs an online price comparison. The reverse bidding system may transmit an offer to the consumer to purchase the product at the physical merchant location for a discounted price.

20 Claims, 3 Drawing Sheets

METHOD, COMPUTER-BASED SYSTEM, AND NON-TRANSITORY COMPUTER READABLE STORAGE MEDIUM UTILIZING MACHINE LEARNING TO PREVENT FRAUD WITH A DIGITAL WALLET

FIELD

The disclosure generally relates to bidding platforms, and more specifically, to systems and methods for providing real time data updates about reverse bidding to mobile devices.

BACKGROUND

Brick and mortar merchants provide goods and services that consumers may be able to inspect and purchase on the spot. However, consumers often visit brick and mortar merchants to compare items, then go online to find a lower price for the item and purchase the item online. Thus, brick and mortar merchants are often not able to complete a sale with a consumer in their store, even if the merchant would have been willing to sell the item for the price the consumer found online.

SUMMARY

Systems, methods, and articles of manufacture (collectively, the "system") for providing a reverse bidding platform are disclosed. The system may perform operations including calculating a confidence score, wherein the confidence score indicates a likelihood that a consumer will conduct a non-fraudulent purchase of a product; determining, based on a signal from a mobile device of the consumer, that the mobile device is located within a physical location of a merchant, wherein the product is available for sale from the merchant for a first price; performing an online price comparison for the product; selecting, based on criteria provided by the merchant, a second price for the product, wherein the second price is lower than the first price; and transmitting an offer to the mobile device to purchase the product from the merchant for the second price.

In various embodiments, the computer-based system performs the online price comparison in response to the consumer scanning the product. The second price may be equal to a lowest available price found in the online price comparison. Calculating the confidence score may comprise receiving online data from a third-party data server; receiving fraud data from a device fraud server; and receiving transaction history data from a transaction account issuer server. The system may receive, from the mobile device, an authorization request to purchase the product from the merchant for the second price. The merchant criteria may comprise a minimum confidence score for the consumer. The system may generate a reverse bidding report.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
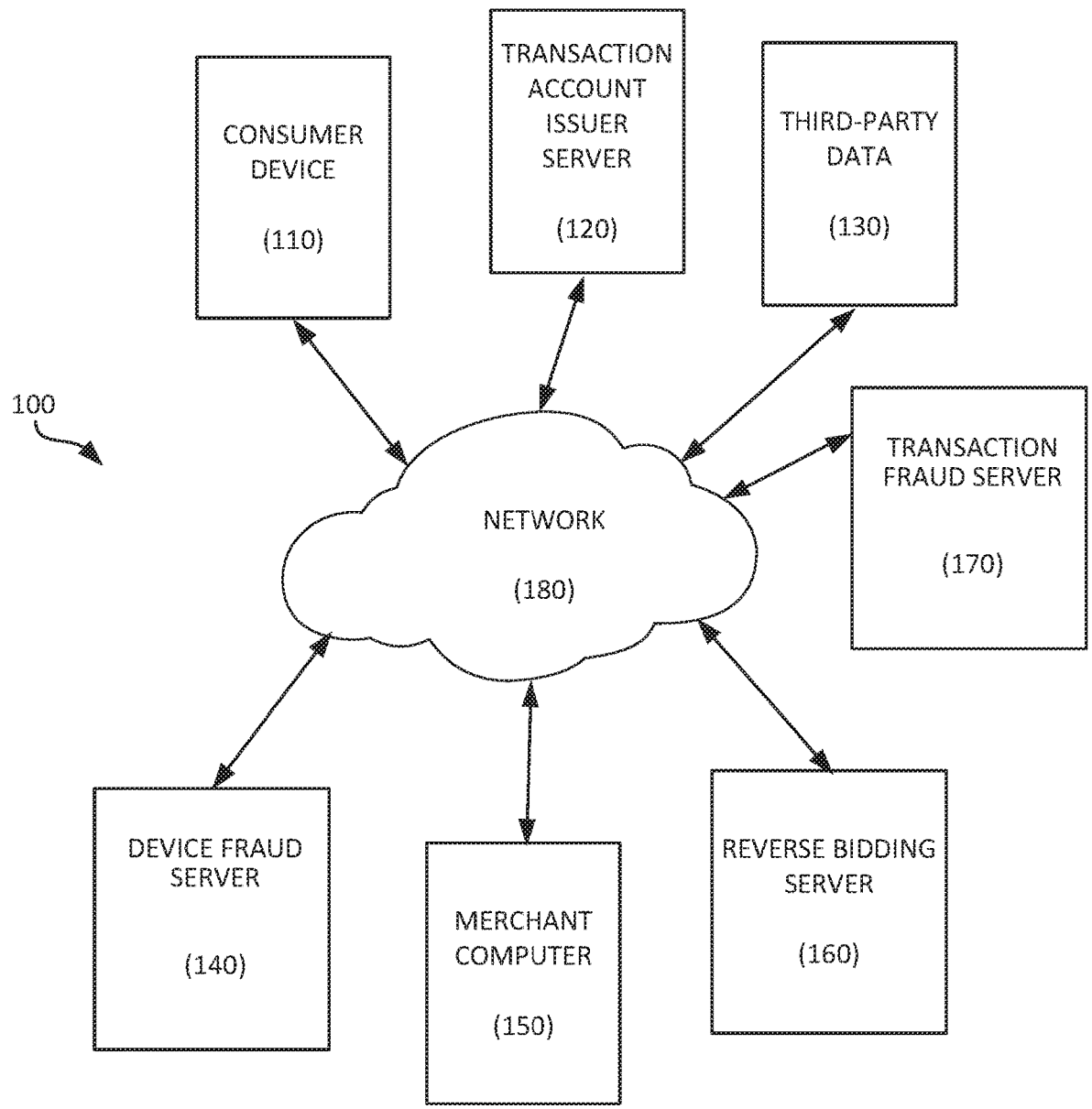
FIG. 1 is a block diagram illustrating various system components of a reverse bidding system, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In general, and in various embodiments, the systems may provide a mechanism for merchants to offer discounted prices to consumers within their store who may be searching online for lower prices at a different merchant. A reverse bidding platform may evaluate a likelihood that a consumer is going to purchase a product. The reverse bidding platform may evaluate data such as consumer online browsing history, transaction history, demographic information, etc., to determine a confidence score that the consumer is likely to buy a specific product. The consumer may enter a brick and mortar store. The reverse bidding platform may search for advertised prices online. The reverse bidding platform may determine, based on merchant input, that the merchant is willing to lower the merchant's price for the product. The reverse bidding platform may transmit a notification to the consumer indicating that the merchant is willing to discount the price of the product. The consumer may complete the purchase using a mobile device or at a merchant point-of-sale. Thus, the merchant may complete a sale with the consumer who may have otherwise ordered the item online for a lower price than the merchant's posted price.

The system significantly improves current customer experience by bringing the best of both worlds of online and in-store shopping into a single, seamless experience. A price check for a product may be performed by the customer on devices with different form factors and interfaces. The system implements multiple classifications as well as regression algorithms to determine the best matching product, significantly improving current product match capabilities. Subsequently, a price check may be performed across static pricing. In addition, this system may provide the ability to execute a price check against an adaptive rule based pricing engine hosted either by the system owner or at merchant data centers. The pricing engine may take into account the specific attributes of the requesting customer (confidence score as well other anonymized attributes) to determine the best possible offer for the specific requesting customer.

Systems participating in this invention as listed in FIG. 1 may be built out in a public cloud, such as Amazon Web Services®. In order to achieve this experience in a reliable, robust, high performing way, the system may implement multiple layers of caching to retrieve and store customer information as well as inventory data for merchants. The system may implement efficient parallelized matching, evaluation, and decisioning algorithms to retrieve pricing data from these matches. The system may also implement optimistic and aggressive hydration and dehydration of caches so as to not impact front-end interactions with customers. The system leverages SVM (support vector machine) based machine learning techniques to determine confidence scores for customers based on their profile as well as geolocation information. In order for the machine learning capabilities to learn and evolve over time based on behavior, customer interaction data will be utilized to enhance customer profiles over time, as well as be utilized to create a variety of reports and trends that will be provided to customers and merchants as appropriate.

In order to ensure privacy of customers, the system may anonymize customer information for all activities described with respect to FIG. 1. Any communication of customer information to merchant or other systems includes no PII (personally identifiable information). Instead, a randomly generated, one-way one time token may be used to represent the customer for a single interaction. Once the interaction is over, the token cannot be reused. This approach may prevent traceback of individual customers either one time, or over time.

In order to ensure security of information in the system, a three-way approach may be taken. First, access from participating systems to each other's information is managed through a single sign on system utilizing the principle of least privilege, and is required for both human as well as system-to-system interactions. Second, systems may communicate over the public internet. However, the communication may be secured through TLS (Transport Layer Security) 2.0. Third, all data—whether at rest or in motion—may be encrypted using expiring symmetric key algorithms based on AES algorithm (FIPS-197). Additionally, encryption keys may be secured through industry standard key management systems.

The system will perform two or more levels of fraud detection. For example, the system may detect and prevent transaction level fraud, and the system may detect and prevent device based fraud leveraging fraud services software, such as InMobile™, which is a product of InAuth, Inc. of Boston, Mass.

More particularly, and with reference to FIG. 1, a system 100 for reverse bidding is illustrated, according to various embodiments. The system 100 may comprise a consumer mobile device 110, a transaction account issuer server 120, a third-party data server 130, a device fraud server 140, a merchant computer 150, a reverse bidding server 160, and a transaction fraud server 170. The various system components may communicate over one or more networks 180.

The consumer mobile device 110 may be a device capable of communication over a network, such as a mobile phone. The consumer mobile device 110 may comprise geolocation hardware which allows other systems to identify the geolocation of the consumer mobile device 110. For example, a NFC chip, a WiFi chip, and/or a SIM card may allow other systems to identify the location of the consumer mobile device 110. The consumer mobile device 110 may comprise a reverse bidding application. In various embodiments, the reverse bidding application may be part of a banking application associated with the transaction account issuer. The reverse bidding application may be capable of interacting with a camera on the consumer mobile device 110, which allows the consumer mobile device 110 to notify the reverse bidding server 160 of a product which the consumer may be interested in purchasing.

In various embodiments, the consumer mobile device 110 may be owned by a merchant. For example, a consumer may enter a mobile location and pick up a hand-held device including a reverse bidding application. The consumer may scan items using the hand-held device, and the hand-held device may provide a user interface which presents reverse bidding information and offers to the consumer.

The transaction account issuer server 120 may comprise one or more processors or databases capable of issuing and maintaining transaction accounts. The transaction account issuer server may receive authorization requests for consumers which have transaction accounts with the transaction account issuer, and the transaction account server may send back an authorization response indicating whether the transaction is authorized. The transaction account issuer server 120 may transmit a request for fraud services to a transaction fraud server 170 in response to receiving an authorization request. The transaction fraud server 170 may transmit information to the transaction account issuer server 120 indicating whether the transaction may be fraudulent. The transaction account issuer server 120 may make the ultimate decision of whether to authorize the transaction.

The third-party data server 130 may comprise one or more processors or databases capable of obtaining and storing data relevant to consumers. For example, the third-party data server 130 may store online browsing data, demographic data, survey data, or any other data relating to consumers.

The device fraud server 140 may comprise one or more processors or databases capable of obtaining and storing data related to the consumer devices and indicating whether the consumer devices are associated with fraudulent activities. For example, the device fraud server 140 may store a unique device ID for each consumer device, and the device fraud server 140 may compare characteristics of each consumer device to calculate a fraud score indicating a likelihood that the consumer device is associated with fraudulent activities. The first time a consumer logs in to a consumer device, a software development kit may create a fingerprint and unique ID which are stored on the consumer device and the device fraud server 140. Each time a request is sent to the device fraud server 140, the request may include the fingerprint and unique ID. The device fraud server 140 may determine whether additional information is necessary to verify a consumer's identity. For example, a consumer may switch devices or change locations with a device, and the device fraud server 140 may require additional information from the consumer to authenticate the device. The device fraud server 140 may store information regarding previous fraudulent activities and compare the information with the fingerprint and unique ID to identify potential fraudulent risks. In various embodiments, the device fraud server 140 may create and compare pools of devices which may or may not be associated with fraudulent activity. These fraud services may be performed by products such as InMobile™, which is a product of InAuth, Inc. of Boston, Mass.

The merchant computer 150 may comprise any device with an interface which allows the merchant to interact with the system 100. For example, the merchant computer 150 may comprise a desktop computer, a mobile phone, or a point-of-sale device. The merchant may utilize the merchant computer 150 to enter reverse bidding criteria and to complete transactions.

The reverse bidding server 160 may comprise one or more servers or databases capable of administrating a reverse bidding process. The reverse bidding server 160 may aggregate and analyze data from various components of the system 100. The reverse bidding server 160 may store merchant-submitted criteria, and operate a software merchant bot which provides reverse bids for products. The criteria may include the types of products on which to provide discounts, minimum scores for consumers who should receive discounts, etc. The reverse bidding server 160 may further host a consumer reverse bidding application and a merchant reverse bidding application which allows the merchant computer 150 and the consumer mobile device 110 to interact with the reverse bidding server 160. The consumer reverse bidding application may allow the consumer mobile device 110 to receive discount offers from the reverse bidding server 160, and the consumer may initiate purchases from the merchant using the consumer reverse bidding application. The merchant reverse bidding application may allow the merchant to input discount criteria using the merchant computer, and the merchant reverse bidding application may allow the merchant to receive analytics reports from the reverse bidding server. In various embodiments, the reverse bidding server 160 may be a subcomponent of the transaction account issuer server 120 or the transaction account issuer server 120. The reverse bidding server 160 may be operated by the same entity. However, in various embodiments, the transaction account issuer server 120 and the reverse bidding server 160 may be operated by different entities.

Figure 2:
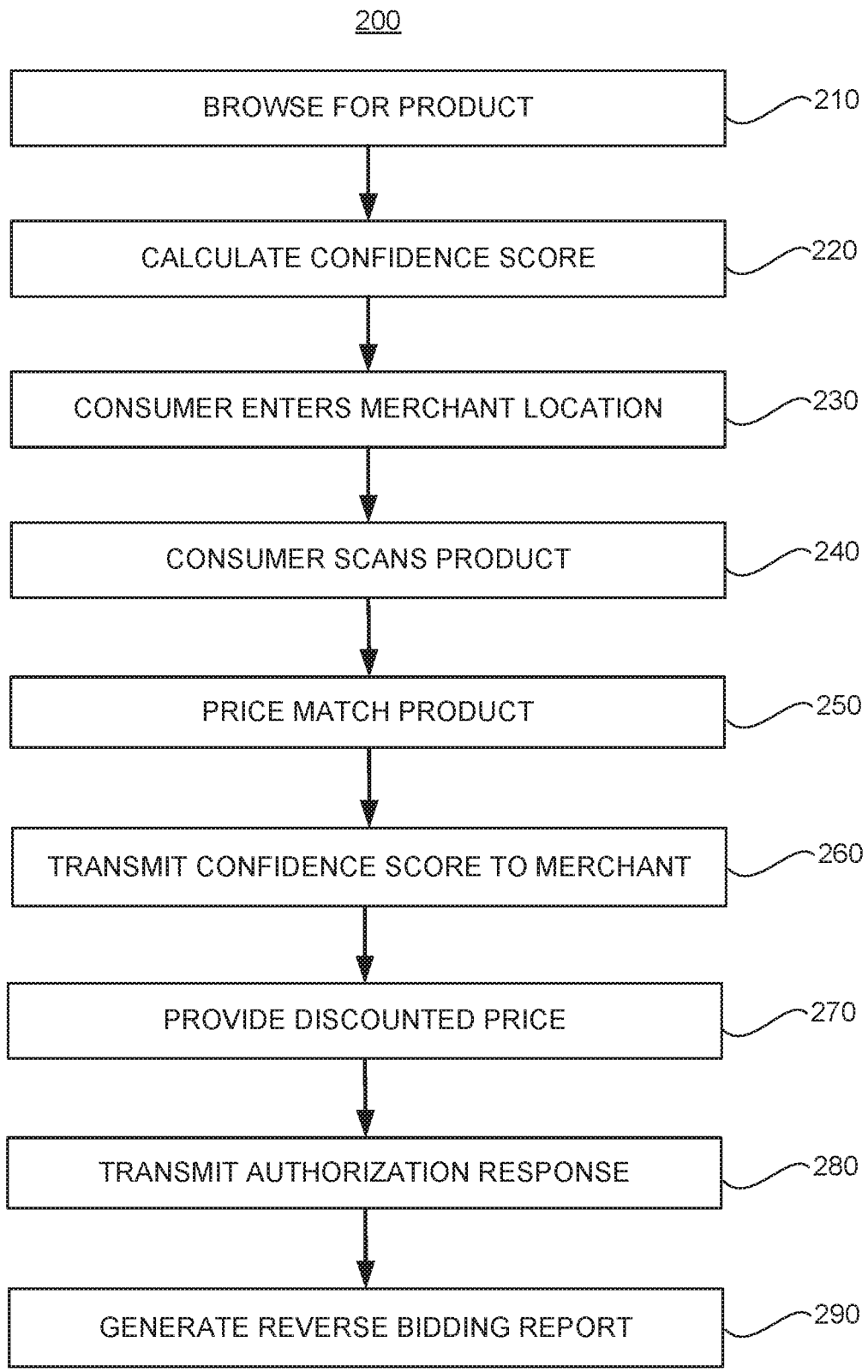
FIG. 2 illustrates process flow for a method of reverse bidding, in accordance with various embodiments.

Referring to FIG. 2, a flowchart 200 of a process for reverse bidding is illustrated, according to various embodiments. A consumer may browse for an item over a network (step 210). The consumer may use a variety of devices, such as a computer, a mobile phone, a voice personal assistant ("VPA") (e.g., Alexa®, a product of Amazon.com, Inc. of Seattle, Wash.) or any other device capable of communicating over a network. For example, the consumer may type in search terms in an internet browser for "television for sale." Similarly, the consumer may click on hyperlinks related to a product, or view social media posts related to a product. The third-party data server may store the consumer's browsing data.

The reverse bidding server may calculate a confidence score that the consumer is going to purchase the product (step 220). The confidence score may be calculated based on various factors, such as a fraud score from the device fraud server, a geolocation, number of previous transaction disputes by the consumer, consumer buying patterns, number of consumer returns, number of offers accepted by the consumer, etc. Each factor may receive a score, for example from 0-100. The scores may be combined in a weighted average to achieve an overall confidence score. In various embodiments, the confidence score may range from 1-10, or from 0-100, or any other suitable range. A higher number may indicate a greater likelihood that the consumer is going to make a non-fraudulent purchase of the product.

In various embodiments, the consumer may have an account with the transaction account issuer. In such cases, the reverse bidding server may utilize historical transaction data in order to calculate a confidence score. Additionally, as the reverse bidding server obtains more data about the consumer over time, the reverse bidding server may be able to more accurately predict whether the consumer may make a purchase in response to an offer. However, in various embodiments, the consumer may not have an account with the transaction account issuer. In such cases, the information available to the reverse bidding server may be more limited, but the reverse bidding platform may still send offers to the consumer.

The reverse bidding server may use a variety of data sources to calculate the confidence score. In various embodiments, the reverse bidding server may purchase the customer's browsing data from the third-party data server. The reverse bidding server may obtain transaction history data from the transaction account issuer server. The transaction history data may include previous purchases made by the consumer. For example, the transaction account history data may indicate that the consumer typically purchases a new television once per year, and the last purchase of a television was ten months ago. The transaction account history data may also include a total amount of average spend, and the spend may be broken down per category to indicate an amount the consumer typically spends on electronics each month or other time period. The transaction account issuer server or third-party data server may also provide demographic information to the reverse bidding server, such as consumer age, address, annual salary, transaction account status, credit score, etc.

The device fraud server may provide fraud data to the reverse bidding server, which may indicate a likelihood that a transaction made with the mobile device may be fraudulent. The reverse bidding server may incorporate the fraud data into the confidence score, which may result in a confidence score that indicates a likelihood that the consumer is going to make a non-fraudulent purchase of the product.

The consumer may enter a physical merchant location, such as a building (step 230). In various embodiments, the reverse bidding server may determine that the consumer has entered the merchant location based on a geolocation of the consumer's mobile device. In various embodiments, the merchant location may include Bluetooth beacons which detect the mobile device and transmit a notification to the reverse bidding server. In various embodiments, the reverse bidding server may receive a GPS location for the mobile device and compare the GPS location to a stored location of the merchant location. In various embodiments, the consumer may open the reverse bidding application on the mobile device, which may transmit a notification to the reverse bidding server that the consumer is within the merchant location.

The consumer may scan a product with the mobile device (step 240). In various embodiments, the consumer may use the reverse bidding application and the camera on the mobile device to scan a price tag, UPC code, or scan or enter other indicia identifying the product. The reverse bidding application may transmit the product data to the reverse bidding server. The reverse bidding server may maintain a database of UPC codes uploaded by merchants. If the consumer does not have an account with the reverse bidding server and/or the transaction account issuer, the reverse bidding application may prompt the consumer to enter registration information. The reverse bidding server may also provide the consumer with the opportunity to register for a transaction account with the transaction account issuer.

The reverse bidding server may search for identical or similar items for sale from other merchants (step 250). In various embodiments, the reverse bidding server may determine that an item is similar based on a similarity in UPC codes. For example, the reverse bidding server may determine that two items are similar if greater than 90% of the UPC codes are identical, such as may be the case with items which differ only in color. In various embodiments, a merchant may create product groupings which identify similar items. The reverse bidding application may search other websites for the price of the same product. In various embodiments, in response to the consumer entering the merchant location and without prompting from the consumer, the reverse bidding server may search for other prices for items which the consumer is likely to purchase.

The reverse bidding server may transmit the price information and the confidence score to the merchant computer (step 260). For example, the reverse bidding server may transmit the lowest available online price, the merchant name, and the confidence score indicating the likelihood that the consumer is going to purchase the product. In various embodiments, the reverse bidding server may provide the price information and confidence score to a software bot residing on the reverse bidding server which includes criteria provided by the merchant. The bot may comprise natural language processing, which may convert a natural language input to correct language for the reverse bidding server. The bot may comprise self-learning capabilities. The merchant computer or software bot may provide a discounted price to offer to the consumer based on merchant input or rules (step 270). In various embodiments, the bot may alter the discounted price as provided by merchant parameters. For example, once 80% of available offers are reached, the bot may limit the discounted price to consumers with a confidence score over 98, then once 90% is reached, the bot may only offer discounted prices for particular products. The consumer may receive the discounted price via the application on the consumer device. In various embodiments, the discounted price may be equal to the lowest available online price, or a percentage of the lowest available online price, such as 95% of the lowest available online price, or 105% of the lowest available online price.

In various embodiments, the merchant may provide additional rules or criteria defining the discounted price, such as only to consumers with a minimum confidence score, or the merchant may select only one or more third-party merchants with whom to match the advertised price. In various embodiments, the merchant may have previously entered the criteria for the discounted price, and a software bot may interact with the reverse bidding server and/or the consumer device in real-time, without requiring the merchant to have a human actively interfacing with the consumer. The reverse bidding server may transmit the discounted price to the consumer. In various embodiments, the discounted price may have a time limit, such that the offer at the discounted price may expire after a predetermined period of time, such as after one hour. In various embodiments, the merchant may set a time limit for the discounted price. An offer section on the consumer device may display the offer and time limit, then the offer may disappear from the section after the time limit expires.

The reverse bidding application may provide a button or link which allows the consumer to purchase the item for the discounted price using a digital wallet on the mobile device. The consumer may select the button, and the digital wallet may transmit an authorization request to the transaction account issuer server. In response to the transaction account issuer server authorizing the transaction request, the transaction account issuer server may transmit an authorization response to the mobile device and/or the merchant computer (step 280). Thus, the consumer may complete the purchase and exit the store without subsequently standing in a line to purchase the product at a standard point-of-sale.

The reverse bidding server may generate a reverse bidding report and transmit the report to the merchant computer (step 290). The reverse bidding report may include information such as conversion rates of customers who used the reverse bidding application, and suggestions for increasing the conversion rate or increasing the profit margin for those consumers who did convert.

Figure 3:
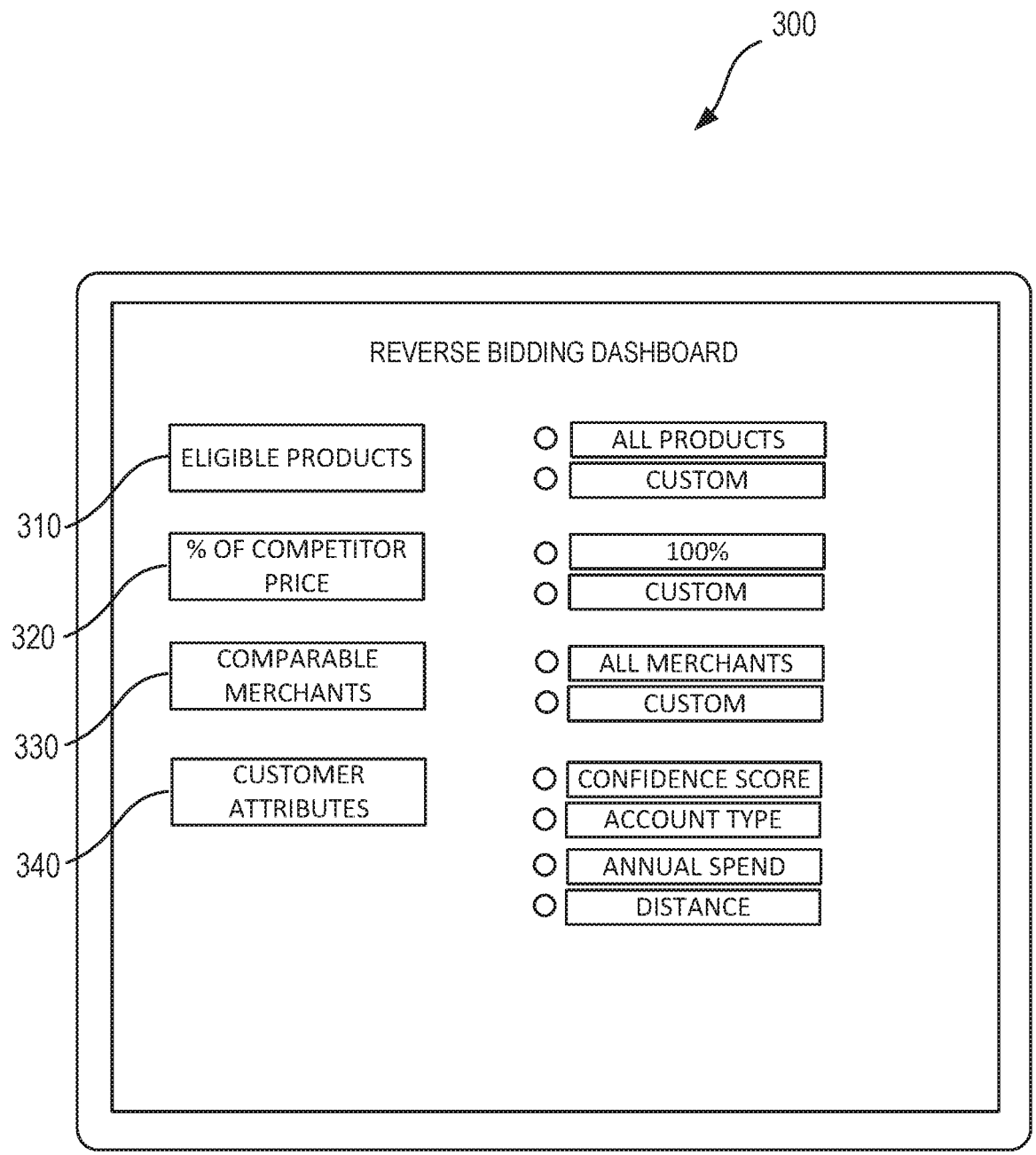
FIG. 3 illustrates an example of a merchant dashboard for reverse bidding, in accordance with various embodiments.

Referring to FIG. 3, an exemplary merchant dashboard 300 is illustrated, according to various embodiments. The merchant dashboard 300 may provide customization options for the merchant to enter discount offers. The merchant dashboard 300 may include a product field 310, which allows the merchant to select which products to provide reverse bids. The merchant may provide stock keeping unit (SKU) data to the reverse bidding server, which may be selected by the merchant in the merchant dashboard 300. The merchant dashboard 300 may include a discount field 320, which indicates how much to discount the price. The merchant may be able to select variable discounts which vary based on the confidence score or time of day. The merchant dashboard 300 may provide a comparable merchant field 330, which allows the merchant to indicate which third-party merchants the reverse bidding platform may use to affect the merchant's price. In various embodiments, the provided discounts may be particular to a specific location of the merchant, as different locations may include different inventory levels. The merchant dashboard 300 may include customer attributes fields 340 which allows the merchant to enter minimum criteria for consumers who should receive discounted offers, such as confidence score, transaction account type, annual consumer spend, distance from consumer home to merchant (which may be calculated using the consumer home address in the registration information), etc.

By utilizing the confidence score in combination with the price matching, the merchant is able to provide the discounted offers only to those consumers who are ready to make a non-fraudulent purchase, without disclosing the discounted price to those consumers who are merely shopping around or are likely to make the purchase fraudulently.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The system or any components may integrate with system integration technology such as, for example, the ALEXA system developed by AMAZON. Alexa is a cloud-based voice service that can help you with tasks, entertainment, general information and more. All Amazon Alexa devices, such as the Amazon Echo, Amazon Dot, Amazon Tap and Amazon Fire TV, have access to the Alexa Voice Service. The system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The system may allow the user to access information about eligible accounts linked to an online account across all Alexa-enabled devices.

The customer may be identified as a customer of interest to a merchant based on the customer's transaction history at the merchant, types of transactions, type of transaction account, frequency of transactions, number of transactions, lack of transactions, timing of transactions, transaction history at other merchants, demographic information, personal information (e.g., gender, race, religion), social media or any other online information, potential for transacting with the merchant and/or any other factors.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A distributed computing cluster used in conjunction with big data sets may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE®.pdf document, etc.), an "ebook," an "emagazine," an application or microapplication (as described herein), an SMS or other type of text message, an email, Facebook, Twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory or in-memory (non-spinning) hard drives. A removable storage unit includes a computer usable storage medium having stored therein computer software and/or data.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER, JAVA Virtual Machine running on LINUX or WINDOWS).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as microapplications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" or "product" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

Any databases discussed herein may include relational, hierarchical, graphical, blockchain, object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

As stated above, in various embodiments, the data can be stored without regard to a common format. However, the data set, e.g. a binary large object (BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

The process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-5, but also to the various system components as described above with reference to FIG. 1.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "payment vehicle," "transaction account," "financial transaction instrument," "transaction instrument" and/or the plural form of these terms may be used interchangeably throughout to refer to a financial instrument. Phrases and terms similar to "transaction account" may include any account that may be used to facilitate a financial transaction.

The disclosure and claims do not describe only a particular outcome of providing a reverse bid, but the disclosure and claims include specific rules for implementing the outcome of providing a reverse bid and that render information into a specific format that is then used and applied to create the desired results of providing a reverse bid, as set forth in McRO, Inc. v. Bandai Namco Games America Inc. (Fed. Cir. case number 15-1080, Sep. 13, 2016). In other words, the outcome of providing a reverse bid can be performed by many different types of rules and combinations of rules, and this disclosure includes various embodiments with specific rules. While the absence of complete preemption may not guarantee that a claim is eligible, the disclosure does not sufficiently preempt the field of providing a reverse bid at all. The disclosure acts to narrow, confine, and otherwise tie down the disclosure so as not to cover the general abstract idea of just providing a reverse bid. Significantly, other systems and methods exist for providing a reverse bid, so it would be inappropriate to assert that the claimed invention preempts the field or monopolizes the basic tools of providing a reverse bid. In other words, the disclosure will not prevent others from providing a reverse bid, because other systems are already performing the functionality in different ways than the claimed invention. Moreover, the claimed invention includes an inventive concept that may be found in the non-conventional and non-generic arrangement of known, conventional pieces, in conformance with Bascom v. AT&T Mobility, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

What is claimed is:

1. A method, comprising:
    receiving, by a server computer over a computer network, from a mobile device, a geolocation indicative of a location of the mobile device, wherein the mobile device is associated with a user and, wherein a digital wallet is installed in the mobile device;
    determining, by the server computer, that the mobile device is located within a physical location of a merchant from a plurality of merchants;
    receiving by the server computer from the mobile device, a selected item associated with:
    (i) the merchant and
    (ii) at least one other merchant from the plurality of merchants;
    receiving, by the server computer over the computer network, from the digital wallet of the mobile device, a request to execute a transaction with a point of sale terminal associated with the at least one other merchant;
    computing, by a trained machine learning model implemented in the server computer, a confidence score correlated with the likelihood that the user will execute a non-fraudulent transaction associated with the selected item and the at least one other merchant from the plurality of merchants, based on criteria associated with the at least one other merchant and the confidence score:
    generating, by the server computer, based on the confidence score, a random digital token comprising anonymized information of the user and an expiration constraint to execute the transaction;
    sending, by the server computer, the digital token to the point of sale terminal associated with the at least one other merchant;
    sending, by the server computer, a link to the mobile device associated with the user to enable the execution of the transaction using the digital wallet and the point of sale terminal; and
    updating, by the server computer, the machine learning model at least based on a user interaction data associated with the execution of the transaction.

2. The method of claim 1, wherein receiving the selected item, by the server computer from the mobile device is in response to an item code scanned via the mobile device.

3. The method of claim 1, wherein the at least one other merchant offers the item for sale at a lower price than the merchant.

4. The method of claim 3, further comprising:
    sending, by the server computer to a computing device associated with the merchant, an authorization request to purchase the item from the merchant at the lower price.

5. The method of claim 1, further comprising
    receiving, by the server computer, online data from a third-party data server;
    receiving, by the server computer, fraud data from a device fraud server;
    receiving, by the server computer, transaction history data from a transaction account issuer server; and
    wherein the confidence score is computed by the trained machine learning model implemented in the server computer based at least in part on the online data, the fraud data, and the transaction history data.

6. The method of claim 1, wherein the criteria associate with the at least one other merchant comprises a minimum confidence score for the use.

7. The method of claim 1, further comprising generating, by the server computer, a reverse bidding report.

8. A system comprising:
    a processor,
    a tangible, non-transitory memory configured to communicate with the processor,
    the tangible, non-transitory memory having instructions stored thereon that, in response to execution by the processor, causes the processor to:
    receive, by the processor over a computer network, from a mobile device, a geolocation indicative of a location of the mobile device, wherein the mobile device is associated with a user and, wherein a digital wallet is installed in the mobile device;
    determine, by the processor, that the mobile device is located within a physical location of a merchant from a plurality of merchants;
    receive, by the processor from the mobile device, a selected item associated with:
    (i) the merchant and
    (ii) at least one other merchant from the plurality of merchants;

receive, by the processor, from the digital wallet of the mobile device, a request to execute a transaction with a point of sale terminal associated with the at least one other merchant;

compute, by a trained machine learning model implemented by the processor, a confidence score correlated with the likelihood that the user will execute a non-fraudulent transaction associated with the selected item and the at least one other merchant from the plurality of merchants and based on criteria associated with the at least one other merchant and the confidence score:

generate, by the processor, based on the confidence score, a random digital token comprising anonymized information of the user and an expiration constraint to execute the transaction;

send, by the processor, the digital token to the point of sale terminal associated with the at least one other merchant;

send, by the processor, a link to the mobile device associated with the user to enable the execution of the transaction using the digital wallet and the point of sale terminal; and update, by the processor, the machine learning model at least based on a user interaction data associated with the execution of the transaction.

9. The system of claim 8, wherein the processor receives the selected item from the mobile device in response to an item code scanned via the mobile device.

10. The system of claim 8, wherein the at least one other merchant offers the item for sale at a lower price than the merchant.

11. The system of claim 10, in response to the execution by the processor, further causes the processor to:

send to a computing device associated with the merchant, an authorization request to purchase the item from the merchant at the lower price.

12. The system of claim 8, wherein in response to the execution by the processor, further causes the processor to:

receive, by the processor, online data from a third-party data server;

receive, by the processor, fraud data from a device fraud server;

receive, by the processor, transaction history data from a transaction account issuer server; and wherein the confidence score is computed by the trained machine learning model implemented by the processor based at least in part on the online data, the fraud data, and the transaction history data.

13. The system of claim 8, wherein the criteria associate with the at least one other merchant comprises a minimum confidence score for the user.

14. The system of claim 8, in response to the execution by the processor, further causes the processor to:

generate, by the processor, a reverse bidding report.

15. An article of manufacture including a non-transitory, tangible computer readable storage medium having instructions stored thereon that, in response to execution by a computer-based system, cause the computer-based system to:

receive, by the computer-based system over a computer network, from a mobile device, a geolocation indicative of a location of the mobile device, wherein the mobile device is associated with a user and, wherein a digital wallet is installed in the mobile device;

determine, by the computer-based system, that the mobile device is located within a physical location of a merchant from a plurality of merchants, receive, by the computer-based system from the mobile device, a selected item associated with:
(i) the merchant and
(ii) at least one other merchant from the plurality of merchants;

receive, by the computer-based system, from the digital wallet of the mobile device, a request to execute a transaction with a point of sale terminal associated with the at least one other merchant;

compute, by a trained machine learning model implemented in the computer-based system, a confidence score correlated with the likelihood that the user will execute a non-fraudulent transaction associated with the selected item and the at least one other merchant from the plurality of merchants and based on the confidence score:

generate, by the computer-based system, based on the confidence score, a random digital token comprising anonymized information of the user and an expiration constraint to execute the transaction;

send, by the computer-based system, the digital token to the point of sale terminal associated with the at least one other merchant;

send, by the computer-based system, a link to the mobile device associated with the user to enable the execution of the transaction using the digital wallet and the point of sale terminal; and update, by the computer-based system, the machine learning model at least based on a user interaction data associated with the execution of the transaction.

16. The article of manufacture of claim 15, wherein the computer-based system receives the selected item from the mobile device in response to an item code scanned via the mobile device.

17. The article of manufacture of claim 15, wherein the at least one other merchant offers the item for sale at a lower price than the merchant.

18. The article of manufacture of claim 15, in response to the execution by the processor, further causes the computer-based system to:

send, by the computer-based system to a computing device associated with the merchant, an authorization request to purchase the item from the merchant at the lower price.

19. The article of manufacture of claim 15, wherein in response to execution by a computer-based system, further cause the computer-based system to:

receive, by the computer-based system, online data from a third-party data server;

receive, by the computer-based system, fraud data from a device fraud server;

receive, by the computer-based system, transaction history data from a transaction account issuer server; and wherein the confidence score is computed by the trained machine learning model implemented by the computer-based system based at least in part on the online data, the fraud data, and the transaction history data.

20. The article of manufacture of claim 19, wherein the criteria associated with the at least one other merchant comprises a minimum confidence score for the user.

* * * * *